(12) United States Patent
Zhou et al.

(10) Patent No.: US 12,164,779 B2
(45) Date of Patent: *Dec. 10, 2024

(54) DECK BASED MEDIA MANAGEMENT OPERATIONS IN MEMORY DEVICES

(71) Applicant: Micron Technology, Inc., Boise, ID (US)

(72) Inventors: Zhenming Zhou, San Jose, CA (US); Seungjune Jeon, Santa Clara, CA (US); Zhenlei Shen, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,133

(22) Filed: Jan. 30, 2023

(65) Prior Publication Data

US 2023/0168812 A1 Jun. 1, 2023

Related U.S. Application Data

(63) Continuation of application No. 17/348,226, filed on Jun. 15, 2021, now Pat. No. 11,599,272.

(51) Int. Cl.
*G06F 3/06* (2006.01)
*G06F 7/58* (2006.01)
*G06F 12/02* (2006.01)
*G06F 12/10* (2016.01)

(52) U.S. Cl.
CPC .......... *G06F 3/0616* (2013.01); *G06F 3/0652* (2013.01); *G06F 3/0659* (2013.01); *G06F 3/0679* (2013.01); *G06F 7/588* (2013.01); *G06F 12/0246* (2013.01); *G06F 12/10* (2013.01); *G06F 2212/1036* (2013.01); *G06F 2212/7211* (2013.01)

(58) Field of Classification Search
CPC ...... G06F 3/061; G06F 3/0616; G06F 3/0652; G06F 3/0653; G06F 3/0659; G06F 3/0679; G06F 7/588; G06F 11/004; G06F 12/0246; G06F 12/10; G06F 2212/1036; G06F 2212/7211
See application file for complete search history.

(56) References Cited

U.S. PATENT DOCUMENTS

| | | | |
|---|---|---|---|
| 5,737,742 A | 4/1998 | Achiwa | |
| 2010/0246266 A1* | 9/2010 | Park | G11C 16/10 365/185.11 |
| 2012/0124273 A1* | 5/2012 | Goss | G11C 16/349 711/E12.001 |
| 2016/0085290 A1* | 3/2016 | Skandakumaran | G06F 1/3268 713/320 |
| 2017/0148514 A1 | 5/2017 | Lee | |
| 2017/0228172 A1* | 8/2017 | Wu | G06F 3/0616 |

\* cited by examiner

*Primary Examiner* — Larry T Mackall
(74) *Attorney, Agent, or Firm* — Lowenstein Sandler LLP

(57) ABSTRACT

Systems and methods are disclosed including a processing device operatively coupled to memory device. The processing device performs operations comprising responsive to receiving a memory access command, determining a portion of the memory device that is referenced by a logical address specified by the memory access command; determining an endurance factor associated with the portion; and modifying, based on a value derived from the endurance factor, a media management metric associated with the portion of the memory device.

20 Claims, 4 Drawing Sheets

DECK BASED MEDIA MANAGEMENT OPERATIONS IN MEMORY DEVICES

RELATED APPLICATION

This application a continuation of U.S. patent application Ser. No. 17/348,226, filed Jun. 15, 2021, the entire contents of which is hereby incorporated by reference herein.

TECHNICAL FIELD

Embodiments of the disclosure generally relate to memory sub-systems, and more specifically, relate to improved memory performance using deck based media management operations in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
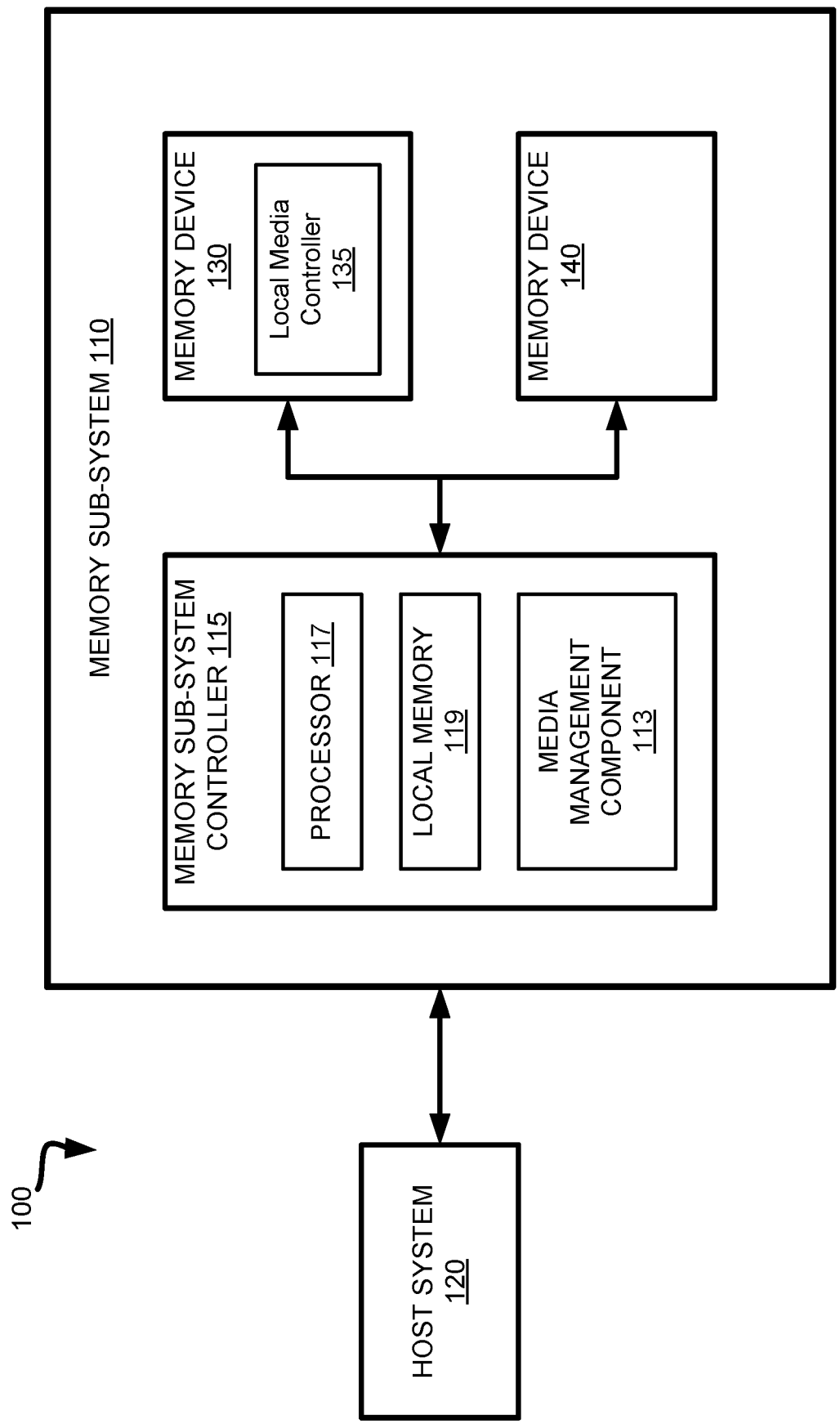
FIG. 1 illustrates an example computing system that includes a memory sub-system in accordance with some embodiments of the present disclosure.

Aspects of the present disclosure are directed to performing deck based media management operations in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include two or more planes. For some types of non-volatile memory devices (e.g., NAND devices), each plane includes of a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matric of memory cells.

Depending on the cell type, each memory cell can store one or more bits of binary information, and has various logic states that correlate to the number of bits being stored. The logic states can be represented by binary values, such as "0" and "1", or combinations of such values. A set of memory cells referred to as a memory page can be programmed together in a single operation, e.g., by selecting consecutive bitlines.

Individual segments, data units, or blocks of the memory device can be written, read, and/or erased only a finite number of times before physical wear causes the memory device to fail. To counteract this limited endurance of the memory device, techniques have been developed to manage wear on the memory device. One technique of managing the endurance is media management, e.g., wear leveling. A wear leveling operation can attempt to evenly distribute the data operations (e.g., read operations, write operations, and erase operations), and thus the corresponding physical wear, across the memory device. One memory device can be divided into multiple management units (MUs), such as pages or blocks of the memory device, which each experience physical wear. An MU can be a group of pages across dice and/or channels. An MU can represent an individual segment of the memory device that can be written or erased in a single operation. Write counts (e.g., the number of times a write operation that writes data to a MU is performed on the MU during the lifetime of the MU), read counts (e.g., the number of times a read operation that reads data from a MU is performed on the MU during the lifetime of the MU), or erase counts (e.g., the number of times an erase operation that erases data from a MU is performed on the MU during the lifetime of the MU) can be strong indicators of wear on the MUs of the memory device. Thus, some wear leveling techniques can use a sorting process to find MUs with high read or write counts and MUs with low read count or write counts. The data from a MU having a high read or write count can be swapped with the data of a MU having low read or write count in an attempt to evenly distribute the wear across the MUs of the memory device.

Some memory devices, such as three-dimensional (3D) cross-point devices, can include multiple portions. A portion, such as a deck or a layer, can be defined as a two-dimensional (2D) array of memory cells electronically addressable by a vertical access line(s). Multiple decks can be stacked within a memory device (e.g., stacked vertically). Each deck can have inherently different levels of endurance. As discussed above, endurance can reflect the expected number of times the deck can be written to, read, and/or erased before physical wear causes the deck to fail. For example, in a two-deck memory device, one deck can fail after approximately eight million program/erase cycles (PECs), while the other deck may fail after approximately four million PECs. If one deck fails in a multi-deck memory device, the entire memory device can experience failure.

Thus, wear leveling operations can underuse decks with a relatively high endurance, and overuse decks with a relatively low endurance. This can result in a reduced service life of the memory device due to a deck with relatively low endurance triggering a failure for the entire memory device.

Aspects of the present disclosure address the above and other deficiencies by implementing deck-based media management operations in memory devices. In some embodiments, the memory sub-system controller can implement a media management metric for each MU of each deck of the memory device. The media management metric can be calculated using any combination of a MU write count, a MU read count, a MU erase count, a deck endurance factor, a read factor, etc. The MU write count can reflect the number of write operations performed on a MU during the lifetime of the MU. The MU read count can reflect the amount of read operations performed on a MU during the lifetime of the MU. The MU erase count can reflect the amount of erase operations performed on a MU during the lifetime of the MU. The read factor can be a weigh value used to normalize (e.g., adjust counts measured by different scales to a common scale) the write count or the read count. The deck endurance factor can reflect a projected endurance of a deck. The memory sub-system controller can use a memory management scheme where higher deck endurance factors decrease the frequency of that the media management metric is increased in response to each memory access command, or decrease the value the media management metric is increased by in response to each memory access command. The deck endurance values can be predetermined values that reflect statistics and analytics related to the manufacturing process of the memory device, performance by other memory devices manufactured under similar conditions, or any other metrics related to the manufacturing, inspection, testing, or performance of the memory device.

In some embodiments, the memory sub-system controller can determine whether the media management metric for a MU satisfies a threshold criterion. For example, the memory sub-system controller can determine whether the value of the media management metric exceeds a predetermined threshold value. The predetermined threshold values can be set during manufacturing and/or calibration of the memory sub-system. Responsive to the media management metric exceeding the predetermined threshold value, the memory sub-system controller can perform a media management operation to relocate the data stored at the MU to a different U.

Advantages of the present disclosure include, but are not limited to, an improved and longer service life of the memory sub-system. For example, the deck based media management metric can distribute the data operations to among multiple decks based on the expected endurance of the each deck. This allows the memory sub-system to extend the service life of the memory device by preventing a single deck from reaching failure when other decks on the memory device are not near the end of their service life. Thus, embodiments of the present disclosure improve the performance and longevity of the memory device by balancing the physical wear of decks in view of the endurance of the deck.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIN controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MHLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs). MUs are one example of a data unit. Super management units (SMUs) are another example of data units, and can include a set of multiple MUs (e.g. 1000 MUs, 2000 MUs, etc.)

The memory device 130 can include one or more decks. A deck can be defined as an array of memory cells with electronically conductive access lines. Multiple decks can be stacked within memory device 130. Each deck can have inherently different levels of endurance (e.g., an indication of approximately how many times the deck can be written to, read, and/or erased before physical wear causes the deck to fail).

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as media management operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a media management component 113 that can used to implement media management operations based on a deck endurance metric of each deck of memory device 130. In some embodiments, the memory sub-system controller 115 includes at least a portion of the media management component 113. In some embodiments, the media management component 113 is part of the host system 110, an application, or an operating system. In other embodiments, local media controller 135 includes at least a portion of media management component 113 and is configured to perform the functionality described herein.

Figure 4:
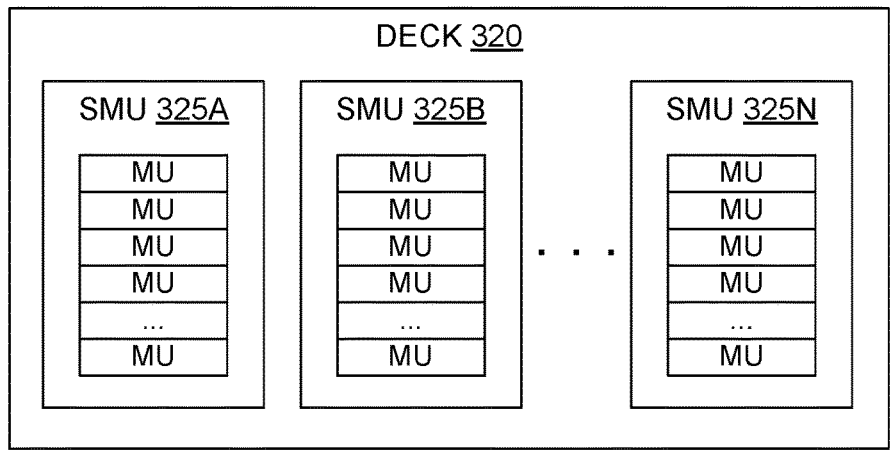
FIG. 4 schematically illustrates example metadata maintained by the memory sub-system controller, in accordance with some embodiments of the present disclosure.

The media management component 113 can perform wear leveling based on a media management metric. A media management metric can reflect a level of wear experience by a MU or SMU and can be used to determine whether to move data from one MU (or SMU) to another MU (or SMU). For example, the media management component 113 can maintain a media management metric for each MU of the memory device. For example, the media management component 113 can maintain a data structure (e.g., a metadata table) composed of multiple records, where each record correlates a MU (via a MU identifier) to a corresponding media management metric value. An example of the metadata table is shown in FIG. 4.

The media management component 113 can then determine whether a media management metric for a MU satisfies a threshold criterion. For example, media management component 113 can determine whether the value of the media management metric exceeds a predetermined threshold value. The predetermined threshold value(s) can be set during manufacturing and/or calibration of the memory sub-system 110. Responsive to the media management metric exceeding the predetermined threshold value, the media management component 113 can perform a media management operation to relocate the data stored at the MU to a different MU.

In some embodiments, the media management operation includes copying, by the media management component 113, data from a MU to an available physical location on the memory device 130. This available physical location can be selected as, for example, a physical location having a lowest write count, a physical location having been least recently accessed, etc. A list of available physical locations can be maintained in a free pool stored in local memory 119. Upon copying the data, media management component 113 records a mapping of a logical address associated with the data from the MU to the available physical address in a look-up table. In one embodiment, the look-up table is maintained in local memory 119 of memory sub-system controller 115. Thus, when the memory sub-system controller 115 applies the logical address to the look-up table, the corresponding physical address is output. In other embodiments, the mapping can be maintained in some other type of data structure, such as an array, linked list, etc.

In some embodiments, the media management metric can be based on a media management metric scheme, such as a deck dependent write scheme, a deck dependent write and read scheme, or any other scheme based on write operations, read operations, and/or erase operations. In some embodiments, the deck dependent write only scheme can be expressed as a ratio of the MU write count to the deck endurance factor (e.g., [MU write count]/[deck endurance factor]). In some embodiments, the deck dependent write and read scheme can be expressed as the sum between the MU read count divided by the read factor, and the MU write count, where the sum is divided by the deck endurance factor (e.g. ([MU write count]+([MU read count]/[read factor]))/[deck endurance factor]). In other embodiments, the deck dependent write and read scheme can be expressed as the ratio of the MU write count to the deck endurance write factor, plus the ratio of the MU read count to the deck endurance read factor (e.g., ([MU write count]/[deck endurance write factor])+([MU read count]/[deck endurance read factor])).

MU write count can reflect the number of write operations performed on a MU during the lifetime of the MU. For example, media management component 113 can track write operations performed on each MU. For each write operation performed on a MU, the media management component 113 can increase the MU write counter by a value of 1.

MU read count can reflect the amount of read operations performed on a MU during the lifetime of the MU. For example, media management component 113 can track read operations performed on each MU. For each read operation performed on a MU, the media management component 113 can increase the MU read counter by a value of 1.

The physical wear on a MU caused by a read operation can be less than the physical wear caused by a write operation. To combine the read count and write count for a MU, the read count or write count for a MU can be normalized (e.g., adjusted to a common scale) by weighting the write count or the read count. In some embodiments, the read factor can reflect the weight of read operations as compared to write operations. The weight of read operations as compared to write operations can be determined and set during manufacturing of the memory sub-system 110 or during programming and/or calibration of the memory sub-system 110. Thus, the read factor enables the media management component 113 adjust the magnitude of each read operation's effect on the media management metric. For example, a read factor of 64 means that 64 read operations are weighed the same as a single write operation. In some embodiments, the read factor can be 16, 32, 64, 128, 256, or any other value. In some embodiments, the read factor can be set to a different value for each deck. The read factor for each deck can be determined and set during manufacturing of the memory sub-system 110 or during programming and/or calibration of the memory sub-system 110. The read factor(s) can reflect a ratio of wear caused an amount of read commands to one write command.

The deck endurance factor can reflect a projected endurance of a deck. In one exemplary example, one of four values (1, 2, 4, and 8) can be assigned to each deck of memory device 130. Each of the four values can be correlated to a deck endurance metric, where the value 1 indicates a baseline endurance level, the value 2 indicates a stronger endurance level than that indicated by value 1, the value 4 indicates a stronger endurance level than that indicated by value 2, and the value 8 indicates a stronger endurance level than that indicated by value 4. The deck endurance values can be determined and set during manufacturing of the memory sub-system 110 or during programming and/or calibration of the memory sub-system 110. The deck endurance values can reflect statistics and analytics related to the manufacturing process, performance by other memory sub-systems manufactured under similar conditions, historic error rates of related memory sub-systems, or any other metrics or parameters related to the manufacturing, inspection, testing, or performance of the memory sub-system 110.

In some embodiments, a media management scheme can use different deck endurance factors for different types of memory access commands. For example, a media management metric scheme can use one value for write commands (e.g., deck endurance write factor), another value for read commands (deck endurance read factor), and yet another value for erase commands (deck endurance erase factor).

By way of illustrative example, using the deck dependent write only scheme and MUs as MUs, for each MU, media management component 113 can increase the MU write operations counter by one for each write operation performed on the MU. The media management metric for the MU can equate to the MU write operations counter divided by the deck endurance factor. The wear-level component 113 can compare the media management metric to a predetermined threshold value. This comparison can be performed by the wear-level component 113 periodically, after each write operation is performed, etc. Responsive to the media management metric exceeding the predetermined threshold value, the media management component 113 can perform a media management operation to relocate the data stored at the MU to a different MU.

By way of illustrative example, using the deck dependent write and write scheme, for each MU, media management component 113 can increases the MU write operations counter by one for each write operation performed on the MU, and increase the read operations counter by 1 divided by the read factor for each read operation performed on the MU. The media management metric for the MU can equate to the sum of the MU write operations counter and the MU read operations counter divided by the deck endurance factor. The wear-level component 113 can compare the media management metric to a predetermined threshold value. Responsive to the media management metric exceeding the predetermined threshold value, the media management component 113 can perform a media management operation to relocate the data stored at the MU to a different MU.

In some embodiments, for each write command received, the media management component 113 can determining a deck endurance factor of the deck referenced by the physical address of the write command. In response to the deck endurance factor being one, the media management component 113 can increase the media management metric by a value of 1. In response to the deck endurance factor being greater than one (value m), the media management component 113 can generate a random number within a specified range (e.g., between 0 or 1 and N). In response to the random number failing to exceed a ratio of N to m (e.g., N/m), the media management metric is increased by a value of one. A table can include multiple records, such that each record indicates a specified range for each deck endurance factor. The specified range can be determined and set during manufacturing of the memory sub-system 110 or during programming and/or calibration of the memory sub-system 110. The specified range can be used to normalize (e.g., adjusted to a common scale) incremental increases of the media management metric by weighting the write count as a function of the deck endurance factor. For example, a deck endurance factor of 2 can indicate that the deck can endure twice as many PECs as a deck with a deck endurance factor of 1. In a specified range of 1-N, N can be set to a value of 4. Accordingly, in response to the random number generator generating the number 1 or 2, the media management component 113 will increase the media management metric by a value of 1 (1 and 2 do not exceed the N/m value of 2). In response to the random number generator generating the number 3 or 4, the media management component 113 will not increase the media management metric (3 and 4 exceed the N/m value of 2).

In some embodiments, for each read command received, the media management component 113 can determine a deck endurance factor of the deck referenced by the physical address translated from a logical address of the read command. In response to the product of the deck endurance factor and the read factor being 1, the media management component 113 can increase the media management metric by a value of 1. In response to the product of the deck endurance factor and the read factor being greater than one (value m), for each read command on the deck, the media management component 113 can generate a random number within a specified range (e.g., between 0 or 1 and N). In response to the random number failing to exceed N/m, the media management metric is increased by a value of one.

In some embodiments, media management metric can be determined as a function of write operations, read operations erase operations, the deck endurance factor, the read factor, or any combination thereof. In schemes that utilize erase operations, an erase counter can reflect the number of times an erase operation (that erases data of a U) is performed on the MU during the lifetime of the U. An erase factor can reflect the weight of erase operations as compared to write operations and/or read operations.

Figure 2:
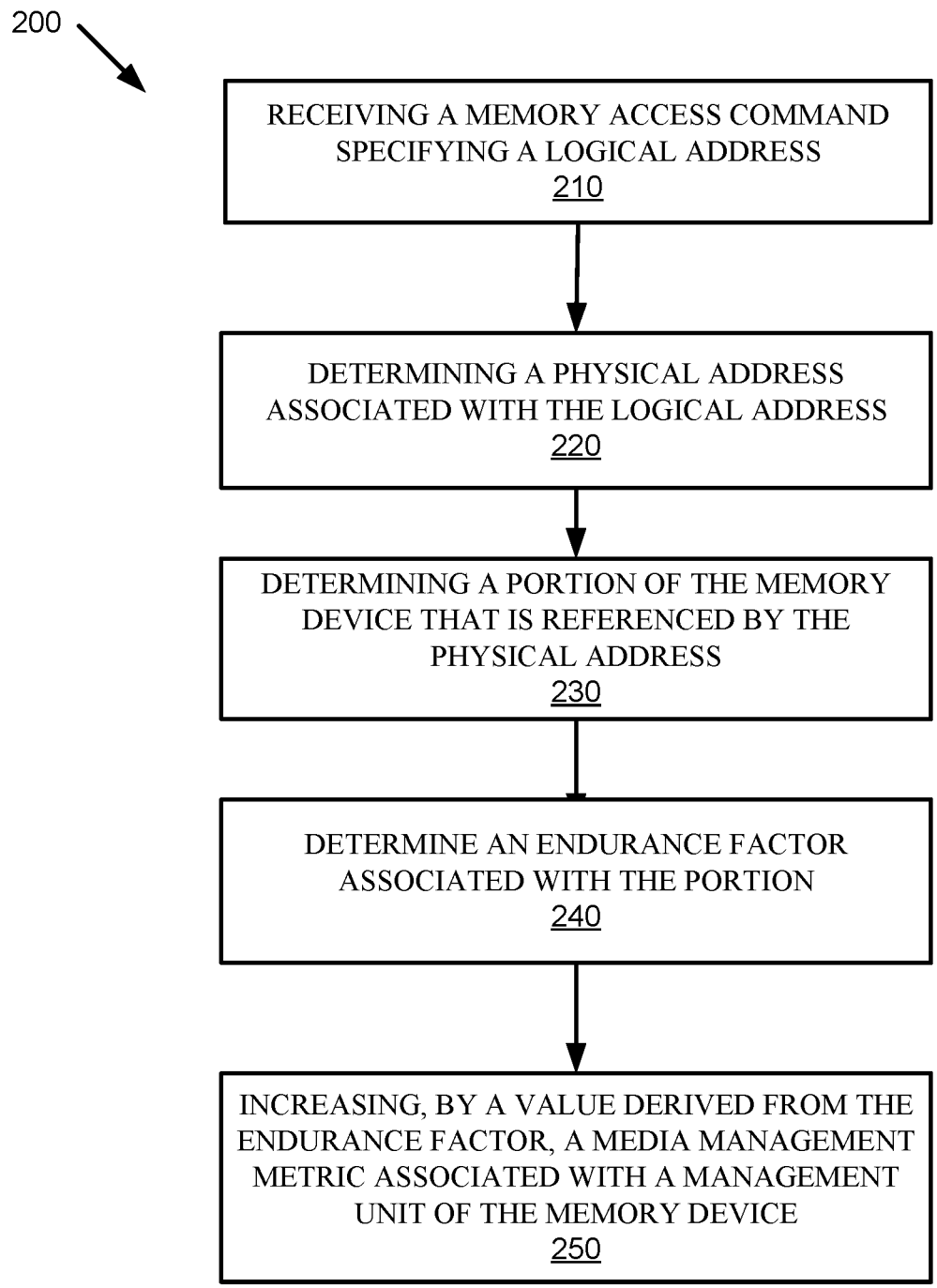
FIG. 2 is a flow diagram of an example method for performing media management operations, in accordance with some embodiments of the present disclosure.

FIG. 2 is a flow diagram of an example method 200 illustrating processes performed for media management operations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear-level component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic can receive a memory access command specifying a logical address. For example, the processing logic can receive a write command, a read command, an erase command, etc.

At operation 220, the processing logic can determine a physical address associated with the logical address. In some embodiments, the physical address can be located in an address space of a deck.

At operation 230, the processing logic can determine a portion of the memory device that is referenced by the physical address. For example, the processing logic can use a table to determine which portion (e.g., deck) of the memory device includes the address space.

At operation 240, the processing logic can determine an endurance factor associated with the portion. For example, the processing logic can look up the endurance factor for the deck using a data structure (e.g., a metadata table).

At operation 250, the processing logic can increase, by a value derived from the endurance factor, a media management metric associated with a management unit of the memory device. The management unit can be referenced by the physical address. In some embodiments, the processing logic can use a media management scheme to determine whether to increase the media management metric, by what amount to increase the media management metric, or any combination thereof. For example, the processing logic can generate a value as a function of the endurance factor, and in response to the value satisfying a threshold criterion, increasing a media management metric associated with the physical address. The value can be generated by generating a random number within a specified range and determining whether the random number exceeds a function of the random number and the endurance factor.

In some embodiments, responsive to determining that the media management metric satisfies a criterion, performing a media management operation with respect to the data located in the address space associated with the physical address. For example, the media management operation can include the processing logic writing data stored at the address space associated with the physical address to a new address space of a different physical address. The different physical address can be selected as, for example, a physical address having a lowest write count, a physical address having been least recently accessed, etc. The processing logic can then map the map the logical address to the different physical address.

Figure 3:
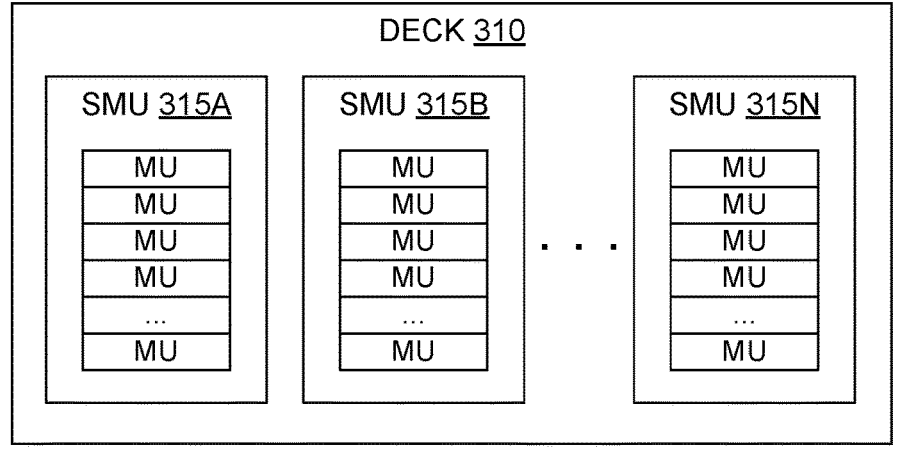
FIG. 3 schematically illustrates example decks maintained by memory device, in accordance with some embodiments of the present disclosure.

FIG. 3 schematically illustrates example decks maintained by memory device 300, in accordance with some embodiments of the present disclosure. Memory device 300 can be similar to memory 130 and/or memory device 140. MUs are one example of a data unit. For example, a MU can be a page (e.g., smallest unit of data that can be written to or read from a cross-point array) of a cross-point array of non-volatile memory or a block (e.g., smallest unit of data that can be erased in flashed-based memory) of flash-based memory. Super management units (SMUs) are another example of data units, and can include a set of multiple management units (e.g. 1000 MUs, 2000 MUs, etc.).

Memory device 300 include deck 310 and deck 320. Each deck 310, 320 can include multiple SMUs. As shown, deck 310 includes SMU 315A through SMU 315N, and deck 320 includes SMU 325A through SMU 325N. Each SMU can include a fixed number of MUs. The media management component 113 can maintain a media management metric for each SMU of memory device 300. Responsive to performing a memory access operation on an SMU, the media management component 113 can increase the media management metric for said SMU using one or more media management schemes of the present disclosure.

FIG. 4 schematically illustrates example metadata maintained by the memory sub-system controller, in accordance with some embodiments of the present disclosure. In some embodiments, media management component 113 can maintain a metadata table 400. In some embodiments, metadata table 400 can be stored in memory of the memory sub-system (e.g., at memory device 130, 140, local memory 119, etc.) and can be referenced by media management component 113 to determine the media management metric for a particular MU or SMU. As illustrated in FIG. 4, metadata table 400, by way of exemplary example, maintains entries that that correlate each SMU of decks 310 and 320 to a media management metric. Each SMU can include an identifier. Media management component 113 can increase the media management metric for said SMU using one or more media management schemes of the present disclosure.

Figure 5:
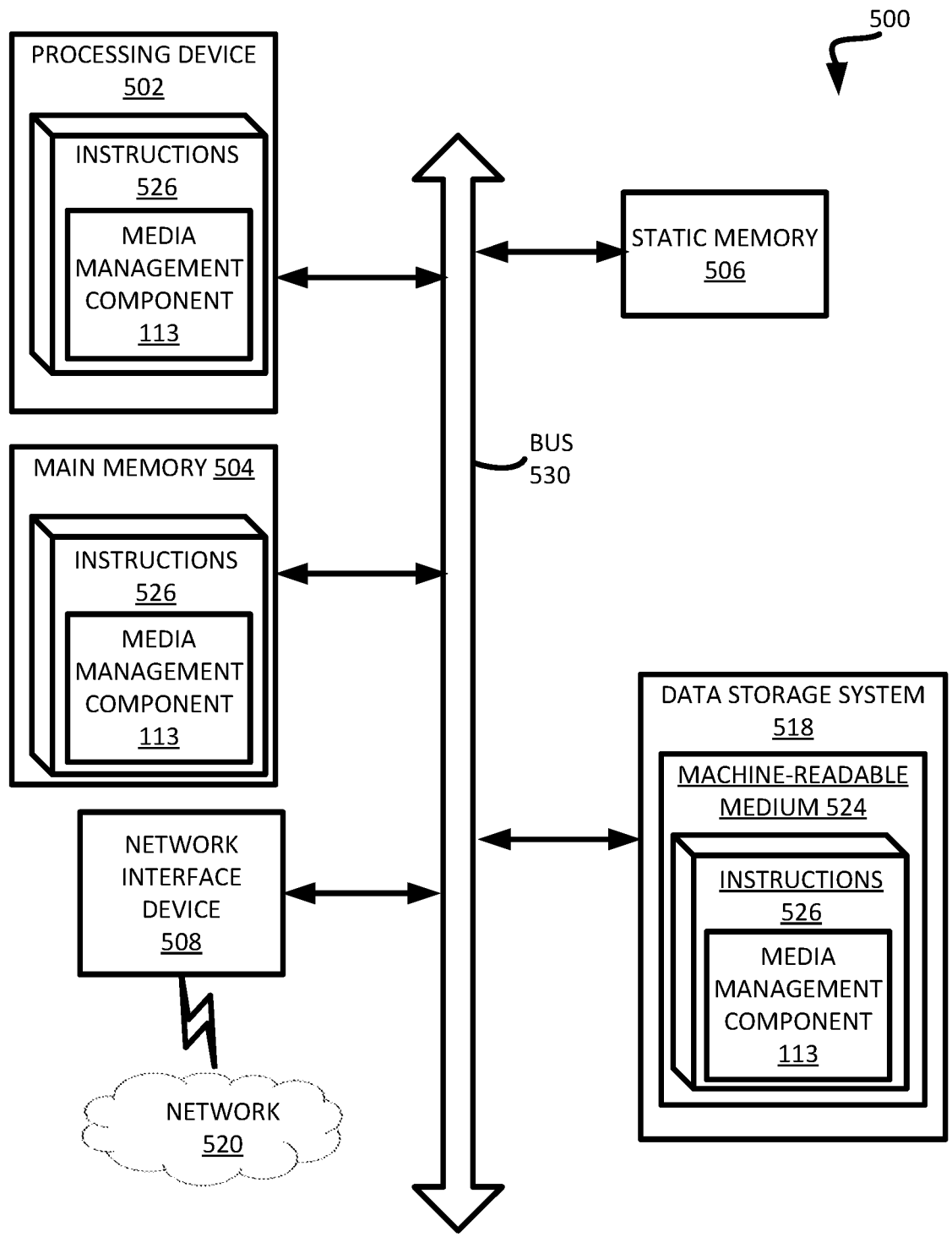
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530. Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to media management component 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
responsive to receiving a memory access command, determining a portion of the memory device that is referenced by a logical address specified by the memory access command;
determining an endurance factor associated with the portion by performing a lookup of the endurance factor using a data structure, wherein the endurance factor reflects a number of program/erase cycles (PECs); and
modifying, based on a first value derived from the endurance factor and a second value, a media management metric associated with the portion of the memory device, wherein the second value is determined by using a weighing factor reflecting physical wear on the memory device caused by a memory access operation type associated with the memory access operation.

2. The system of claim 1, wherein the processing device is to perform further operations comprising:
responsive to determining that the value of the media management metric satisfies a criterion, performing a media management operation with respect to a location of the memory device.

3. The system of claim 2, wherein the media management operation comprises writing data stored at an address space associated with a physical address to a new address space of a different physical address.

4. The system of claim 3, wherein the processing device is to perform further operations comprising:
mapping the logical address to the different physical address.

5. The system of claim 3, wherein the different physical address is associated with a management unit comprising a lowest write count.

6. The system of claim 1, wherein the processing device is to perform further operations comprising:
receiving a read command; and
increasing a media management metric associated with a physical address based on a value generated using the endurance factor and a read factor associated with a weight of read operations as compared to write operations.

7. The system of claim 1, wherein the processing device is to perform further operations comprising:
receiving an erase command; and
increasing a media management metric associated with a physical address based on a value generated using the endurance factor and an erase factor associated with a weight of erase operations as compared to at least one of write operations or read operations.

8. A method comprising:
responsive to receiving, by a processor, a memory access command, determining a portion of a memory device that is referenced by a logical address specified by the memory access command;
determining an endurance factor associated with the portion by performing a lookup of the endurance factor using a data structure, wherein the endurance factor reflects a number of program/erase cycles (PECs); and
modifying, based on a first value derived from the endurance factor and a second value, a media management metric associated with the portion of the memory device, wherein the second value is determined by using a weighing factor reflecting physical wear on the memory device caused by a memory access operation type associated with the memory access operation.

9. The method of claim 8, further comprising:
responsive to determining that the value of the media management metric satisfies a criterion, performing a media management operation with respect to a location of the memory device.

10. The method of claim 9, wherein the media management operation comprises writing data stored at an address space associated with a physical address to a new address space of a different physical address.

11. The method of claim 10, further comprising:
mapping the logical address to the different physical address.

12. The method of claim 10, wherein the different physical address is associated with a management unit comprising a lowest write count.

13. The method of claim 8, further comprising:
receiving a read command; and
increasing a media management metric associated with a physical address based on a value generated using the endurance factor and a read factor associated with a weight of read operations as compared to write operations.

14. The method of claim 8, further comprising:
receiving an erase command; and
increasing a media management metric associated with a physical address based on a value generated using the endurance factor and an erase factor associated with a weight of erase operations as compared to at least one of write operations or read operations.

15. A non-transitory computer-readable storage medium comprising instructions that, when executed by a processing device operatively coupled to a memory device, performs operations comprising:
responsive to receiving a memory access command, determining a portion of the memory device that is referenced by a logical address specified by the memory access command;
determining an endurance factor associated with the portion by performing a lookup of the endurance factor using a data structure, wherein the endurance factor reflects a number of program/erase cycles (PECs); and
modifying, based on a first value derived from the endurance factor and a second value, a media management metric associated with the portion of the memory device, wherein the second value is determined by using a weighing factor reflecting physical wear on the memory device caused by a memory access operation type associated with the memory access operation.

16. The non-transitory computer-readable storage medium of claim 15, wherein the processing device is to perform further operations comprising:
responsive to determining that the value of the media management metric satisfies a criterion, performing a media management operation with respect to a location of the memory device.

17. The non-transitory computer-readable storage medium of claim 16, wherein the media management operation comprises writing data stored at an address space associated with a physical address to a new address space of a different physical address.

18. The non-transitory computer-readable storage medium of claim 17, wherein the different physical address is associated with a management unit comprising a lowest write count.

19. The non-transitory computer-readable storage medium of claim 15, wherein the processing device is to perform further operations comprising:
receiving a read command; and
increasing a media management metric associated with a physical address based on a value generated using the endurance factor and a read factor associated with a weight of read operations as compared to write operations.

20. The non-transitory computer-readable storage medium of claim 15, wherein the processing device to perform further operations comprising:
receiving an erase command; and
increasing a media management metric associated with a physical address based on a value generated using the endurance factor and an erase factor associated with a weight of erase operations as compared to at least one of write operations or read operations.

* * * * *